(12) United States Patent
Kuniyoshi et al.

(10) Patent No.: US 7,931,756 B2
(45) Date of Patent: Apr. 26, 2011

(54) METHOD AND MACHINE OF MAKING RARE-EARTH ALLOY GRANULATED POWDER AND METHOD OF MAKING RARE-EARTH ALLOY SINTERED BODY

(75) Inventors: Futoshi Kuniyoshi, Osaka (JP); Tomoiku Otani, Yao (JP)

(73) Assignee: Hitachi Metals, Ltd., Minato-ku, Tokyo (JP)

( * ) Notice: Subject to any disclaimer, the term of this patent is extended or adjusted under 35 U.S.C. 154(b) by 0 days.

(21) Appl. No.: 12/573,374

(22) Filed: Oct. 5, 2009

(65) Prior Publication Data

US 2010/0021335 A1    Jan. 28, 2010

Related U.S. Application Data

(62) Division of application No. 10/497,058, filed as application No. PCT/JP02/12399 on Nov. 27, 2002, now Pat. No. 7,622,010.

(30) Foreign Application Priority Data

Nov. 28, 2001 (JP) ................................ 2001-362436
Oct. 11, 2002 (JP) ................................ 2002-298621

(51) Int. Cl.
*H01F 1/04* (2006.01)
*H01F 1/053* (2006.01)

(52) U.S. Cl. .......... 148/105; 148/101; 148/103; 419/23; 419/30; 419/38

(58) Field of Classification Search ........................ None
See application file for complete search history.

(56) References Cited

U.S. PATENT DOCUMENTS

| 4,770,723 A | 9/1988 | Sagawa et al. |
| 4,792,368 A | 12/1988 | Sagawa et al. |
| 5,000,800 A | 3/1991 | Sagawa |
| 5,124,100 A | 6/1992 | Nishii et al. |
| 5,383,978 A | 1/1995 | Yamamoto et al. |
| 5,575,830 A | 11/1996 | Yamashita et al. |
| 5,666,635 A | 9/1997 | Kaneko et al. |
| 6,187,259 B1 | 2/2001 | Yamashita et al. |
| 7,214,343 B2 | 5/2007 | Kuniyoshi et al. |

FOREIGN PATENT DOCUMENTS

| EP | 0 270 934 B1 | 6/1988 |
| EP | 0 429 881 A2 | 6/1991 |
| EP | 0 991 086 A1 | 4/2000 |
| EP | 1 020 285 A2 | 7/2000 |

(Continued)

OTHER PUBLICATIONS

Machine Translation of JP 10-140202.*

(Continued)

*Primary Examiner* — John P Sheehan
(74) *Attorney, Agent, or Firm* — Nixon Peabody LLP; Jeffrey L. Costellia (57) ABSTRACT

A method of making a rare-earth alloy granulated powder according to the present invention includes the steps of: preparing a rare-earth alloy powder; generating remnant magnetization in the powder; and granulating the powder by utilizing agglomeration force produced by the remnant magnetization of the powder. Since the agglomeration force produced by the remnant magnetization is utilized, the addition of a granulating agent may be omitted.

9 Claims, 5 Drawing Sheets

FOREIGN PATENT DOCUMENTS

| | | |
|---|---|---|
| JP | 49-119193 | 11/1974 |
| JP | 51-20593 | 2/1976 |
| JP | 57-124599 | 8/1982 |
| JP | 61-179801 | 8/1986 |
| JP | 63-110521 | 7/1988 |
| JP | 63-237402 | 10/1988 |
| JP | 01-114008 | 5/1989 |
| JP | 1-127643 | 5/1989 |
| JP | 4-100532 A | 6/1991 |
| JP | 4-071632 | 3/1992 |
| JP | 06-039267 | 2/1994 |
| JP | 6-28213 | 4/1994 |
| JP | 10-058198 | 3/1998 |
| JP | 10-140202 | 5/1998 |
| JP | 11-131101 | 5/1999 |
| JP | 2001-137684 | 5/2001 |

OTHER PUBLICATIONS

ASM Materials Engineering Dictionary, 1992, p. 369.*

Kishimoto, et al. "Magnetic properties of sintered sendust alloys using powders granulated by spray drying method", Journal of Materials Science; vol. 38, No. 16; Abstract; Aug. 2003.

Official Communication and Translation of Official Communication, Issued Aug. 1, 2005, German patent application file No. 102 97 484.5-24.

* cited by examiner

METHOD AND MACHINE OF MAKING RARE-EARTH ALLOY GRANULATED POWDER AND METHOD OF MAKING RARE-EARTH ALLOY SINTERED BODY

TECHNICAL FIELD

The present invention relates to a method and machine of making a rare-earth alloy granulated powder and a method of making a rare-earth alloy sintered body.

BACKGROUND ART

A rare-earth alloy sintered magnet (permanent magnet) is normally produced by compacting a powder of a rare-earth alloy, sintering the resultant powder compact and then subjecting the sintered body to an aging treatment. Permanent magnets currently used extensively in various applications include rare-earth-cobalt based magnets and rare-earth-iron-boron based magnets. Among other things, the rare-earth-iron-boron based magnets (which will be referred to herein as "R—Fe—B based magnets", where R is one of the rare-earth elements including Y, Fe is iron, and B is boron) are used more and more often in various electronic appliances. This is because an R—Fe—B based magnet exhibits a maximum energy product, which is higher than any of various other types of magnets, and yet is relatively inexpensive.

An R—Fe—B based sintered magnet includes a main phase consisting essentially of a tetragonal $R_2Fe_{14}B$ compound, an R-rich phase including Nd, for example, and a B-rich phase. In the R—Fe—B based sintered magnet, a portion of Fe may be replaced with a transition metal such as Co or Ni and a portion of boron (B) may be replaced with carbon (C). An R—Fe—B based sintered magnet, to which the present invention is applicable effectively, is described in U.S. Pat. Nos. 4,770,723 and 4,792,368, for example.

In the prior art, an R—Fe—B based alloy has been prepared as a material for such a magnet by an ingot casting process. In an ingot casting process, normally, rare-earth metal, electrolytic iron and ferroboron alloy as respective start materials are melted by an induction heating process, and then the melt obtained in this manner is cooled relatively slowly in a casting mold, thereby preparing an alloy ingot.

Recently, a rapid cooling process such as a strip casting process or a centrifugal casting process has attracted much attention in the art. In a rapid cooling process, a molten alloy is brought into contact with, and relatively rapidly cooled by, a single chill roller, a twin chill roller, a rotating disk or the inner surface of a rotating cylindrical casting mold, thereby making a solidified alloy, which is thinner than an alloy ingot, from the molten alloy. The solidified alloy prepared in this manner will be referred to herein as an "alloy flake". The alloy flake produced by such a rapid cooling process usually has a thickness of about 0.03 mm to about 10 mm. According to the rapid cooling process, the molten alloy starts to be solidified from its surface that has been in contact with the surface of the chill roller. That surface of the molten alloy will be referred to herein as a "roller contact surface". Thus, in the rapid cooling process, columnar crystals grow in the thickness direction from the roller contact surface. As a result, the rapidly solidified alloy, made by a strip casting process or any other rapid cooling process, has a structure including an $R_2Fe_{14}B$ crystalline phase and an R-rich phase. The $R_2Fe_{14}B$ crystalline phase usually has a minor-axis size of about 0.1 μm to about 100 μm and a major-axis size of about 5 μm to about 500 μm. On the other hand, the R-rich phase, which is a non-magnetic phase including a rare-earth element R at a relatively high concentration and having a thickness (corresponding to the width of the grain boundary) of about 10 μm or less, is dispersed on the grain boundary between the $R_2Fe_{14}B$ crystalline phases.

Compared to an alloy made by the conventional ingot casting process or die casting process (such an alloy will be referred to herein as an "ingot alloy"), the rapidly solidified alloy has been quenched in a shorter time (i.e., at a cooling rate of $10^{2}°$ C./s to $10^{4}°$ C./s). Accordingly, the rapidly solidified alloy has a finer structure and a smaller crystal grain size. In addition, in the rapidly solidified alloy, the grain boundary thereof has a greater area and the R-rich phase is dispersed broadly and thinly over the grain boundary. Thus, the rapidly solidified alloy also excels in the dispersiveness of the R-rich phase. Because the rapidly solidified alloy has the above-described advantageous features, a magnet with excellent magnetic properties can be made from the rapidly solidified alloy.

An alternative alloy preparation method called "Ca reduction process (or reduction/diffusion process)" is also known in the art. This process includes the processing and manufacturing steps of: adding metal calcium (Ca) and calcium chloride (CaCl) to either the mixture of at least one rare-earth oxide, iron powder, pure boron powder and at least one of ferroboron powder and boron oxide at a predetermined ratio or a mixture including an alloy powder or mixed oxide of these constituent elements at a predetermined ratio; subjecting the resultant mixture to a reduction/diffusion treatment within an inert atmosphere; diluting the reactant obtained to make a slurry; and then treating the slurry with water. In this manner, a solid of an R—Fe—B based alloy can be obtained.

It should be noted that any small block of a solid alloy will be referred to herein as an "alloy block". The "alloy block" may be any of various forms of solid alloys that include not only solidified alloys obtained by cooling a melt of a material alloy (e.g., an alloy ingot prepared by the conventional ingot casting process or an alloy flake prepared by a rapid cooling process such as a strip casting process) but also a solid alloy obtained by the Ca reduction process.

An alloy powder to be compacted is obtained by performing the processing steps of: coarsely pulverizing an alloy block in any of these forms by a hydrogen occlusion process, for example, and/or any of various mechanical milling processes (e.g., using a disk mill); and finely pulverizing the resultant coarse powder (with a mean particle size of 10 μm to 500 μm) by a dry milling process using a jet mill, for example.

The R—Fe—B based alloy powder to be compacted preferably has a mean particle size of 1.5 μm to about 6 μm to achieve sufficient magnetic properties. It should be noted that the "mean particle size" of a powder refers to herein an FSSS particle size unless stated otherwise. However, when a powder with such a small mean particle size is used, the resultant flowability, compactability (including cavity fill density and compressibility) and productivity will be bad.

To overcome this problem, a method of coating the surface of alloy powder particles with a lubricant was proposed. For example, Japanese Laid-Open Publication No. 08-111308 and U.S. Pat. No. 5,666,635 disclose the technique of making an R—Fe—B based alloy fine powder (with a mean particle size of 1.5 μm to 5 μm) by adding 0.02 mass % to 5.0 mass % of a lubricant (including at least one liquefied fatty acid ester) to an R—Fe—B based alloy coarse powder with a mean particle size of 10 μm to 500 μm and then pulverizing the mixture by a jet mill within an inert gas.

The lubricant not only improves the flowability and compactability (or compressibility) of the powder but also functions as a binder for increasing the hardness (or strength) of the compact. Nevertheless, the lubricant may also remain as residual carbon in the sintered body to possibly deteriorate the magnetic properties. Accordingly, the lubricant needs to exhibit good binder removability. For example, Japanese Laid-Open Publication No. 2000-306753 discloses, as preferred lubricants with good binder removability, depolymerized polymers, mixtures of a depolymerized polymer and a hydrocarbon solvent, and mixtures of a depolymerized polymer, a low-viscosity mineral oil and a hydrocarbon solvent.

According to this method using a lubricant, however, a certain degree of improvement is achieved but it is still difficult to fill the cavity with the powder sufficiently uniformly or achieve a sufficient degree of compactability. Among other things, a powder made by a strip casting process or any other rapid quenching process (at a cooling rate of $10^{2°}$ C./s to $10^{4°}$ C./s) has a smaller mean particle size and a sharper particle size distribution than a powder made by an ingot casting process, and therefore, exhibits particularly bad flowability. For that reason, the amount of the powder to be loaded into the cavity may sometimes go beyond its allowable range or the in-cavity fill density may become non-uniform. As a result, the variations in the mass or dimensions of the compacts may exceed their allowable ranges or the compacts may crack or chip.

As another method for improving the flowability and compactability of an R—Fe—B based alloy powder, there was a proposal to make a granulated powder.

For example, Japanese Laid-Open Publication No. 63-237402 discloses that the compactability should be improvable with a granulated powder to be obtained by adding 0.4 mass % to 4.0 mass % of mixture of a paraffin compound (which is liquid at room temperature) and an aliphatic carboxylate to the powder, and mulling and granulating them together. A method in which polyvinyl alcohol (PVA) is used as a granulating agent is also known. It should be noted that the granulating agent, as well as a lubricant, functions as a binder for increasing the strength of the compact.

If the granulating agent disclosed in Japanese Laid-Open Publication No. 63-237402 is used, however, then the binder removability is so bad that the magnetic properties of an R—Fe—B based sintered magnet will be deteriorated by carbon remaining in the sintered body.

On the other hand, the granulated powder produced by applying a spray dryer method to PVA has high binding force and therefore is too hard to be broken completely even on the application of an external magnetic field. Accordingly, the primary particles thereof cannot be aligned with the magnetic field sufficiently and no magnets with excellent magnetic properties can be obtained. PVA also has bad binder removability and carbon derived from PVA is likely to remain in the magnets. This problem may be overcome by performing a binder removal process within a hydrogen atmosphere. However, it is still difficult to remove that carbon sufficiently.

To solve the problem that the granulated powder is difficult to break even under the aligning magnetic field, the applicant of the present application proposed a method of making a granulated powder, in which respective powder particles (i.e., primary particles) aligned with a magnetic field applied are coupled together with a granulating agent, by granulating the material powder with a static magnetic field applied thereto (see Japanese Laid-Open Publication No. 10-140202). If this granulated powder is used, the magnetic properties are improvable compared with using a granulated powder in which primary particles not aligned with a magnetic field applied are coupled together with a granulating agent. However, it is difficult to align the powder particles being pressed with the magnetic field sufficiently. Consequently, the resultant magnetic properties are lower than a situation where a non-granulated rare-earth alloy powder was used.

Various granulating agents and granulating methods have been proposed so far as described above. However, a method for mass-producing a rare-earth alloy granulated powder, which has excellent flowability and compactability and which can contribute to producing magnets with good magnetic properties, has not yet been developed.

On the other hand, demands for smaller, thinner and performance-enhanced magnets have been escalating. Thus, the development of a method for producing small or thin high-performance magnets with high productivity is awaited. Generally speaking, if a rare-earth alloy sintered body (or a magnet obtained by magnetizing the sintered body) is machined, then its magnetic properties will deteriorate due to a strain caused by the machining process. Such deterioration in magnetic properties is non-negligible in a small magnet. Accordingly, the smaller the size of the magnet to be obtained, the more necessary it is to make a sintered body that has so high dimensional accuracy as to need almost no machining at all and also has the final shape to be obtained. Demands for a rare-earth alloy powder with excellent flowability and compactability (e.g., an R—Fe—B based alloy powder among other things) have been further growing for these reasons, too.

DISCLOSURE OF INVENTION

In order to overcome the problems described above, a primary object of the present invention is to provide a method of making a rare-earth alloy granulated powder, which has good flowability and good compactability and which makes it possible to produce a magnet with excellent magnetic properties, and a method of making a quality rare-earth alloy sintered body with high productivity.

A method of making a rare-earth alloy granulated powder according to the present invention includes the steps of: preparing a rare-earth alloy powder; generating remnant magnetization in the powder; and granulating the powder by utilizing agglomeration force produced by the remnant magnetization of the powder, thereby achieving the object described above.

The step of granulating preferably includes the step of giving kinetic energy to particles of the powder, and the particles preferably grow under a tumbling action, produced by the kinetic energy given, under a substantially zero magnetic field.

The method may include the steps of: preparing the powder with remnant magnetization in a vessel; and giving the powder particles kinetic energy under a substantially zero magnetic field in the vessel. Alternatively, the method may include the steps of: preparing the powder in a vessel; generating remnant magnetization in the powder in the vessel by applying a magnetic field to the powder; and giving kinetic energy to the powder particles with the remnant magnetization under a substantially zero magnetic field in the vessel.

The method may further include the step of adding a granulating agent to the powder. Alternatively, the method may further include the step of not adding any granulating agent to the powder.

The step of generating remnant magnetization in the powder preferably includes the step of applying an alternating demagnetizing field.

The rare-earth alloy is preferably an R—Fe—B based alloy including 2 mass % or more of Dy, 1 mass % or more of Tb, or 1 mass % or more of Dy and Tb.

The powder preferably has a mean particle size of 1.5 μm to 6 μm.

The step of granulating preferably includes the step of making a granulated powder with a mean particle size of 0.05 mm to 3.0 mm.

A method of making a rare-earth alloy sintered body according to the present invention includes the steps of: making a rare-earth alloy granulated powder by one of the methods described above; filling a cavity with a rare-earth alloy powder, including the granulated powder, without applying any demagnetizing magnetic field to the granulated powder; making a compact by pressing the rare-earth alloy powder, including the granulated powder, with an aligning magnetic field applied thereto; and sintering the compact, thereby achieving the object described above.

A rare-earth alloy granulated powder according to the present invention is characterized by including a rare-earth alloy powder with remnant magnetization and a mean particle size of 1.5 μm to 6 μm, having a mean particle size of 0.05 mm to 3.0 mm, and being coupled together via agglomeration force produced by remnant magnetization.

A method of making a rare-earth alloy granulated powder according to a preferred embodiment of the present invention is characterized by including the steps of: (a) preparing a rare-earth alloy powder with remnant magnetization in a vessel by mounting the powder on a base plate with air permeability; (b) generating a first gas flow in the vessel such that the first gas flow goes upward from under the base plate; (c) giving kinetic energy to the powder particles by way of the first gas flow, thereby granulating the powder under a substantially zero magnetic field by utilizing agglomeration force produced by the remnant magnetization of the powder and tumbling action produced by the kinetic energy; (d) generating a second gas flow in the vessel such that the second gas flow goes downward from over the base plate; and (e) forming a powder layer out of the powder on the base plate and compressing the powder layer with the second gas flow. The method is also characterized in that at least a part of the step (d) and at least a part of the step (b) are carried out simultaneously, thereby achieving the object described above.

In one preferred embodiment, a period in which the steps (d) and (b) are carried out simultaneously includes a period in which the flow rate of the first gas flow is decreased while that of the second gas flow is increased.

The step (a) may include the steps of loading a rare-earth alloy powder with no remnant magnetization into the vessel and generating remnant magnetization in the powder with no remnant magnetization, which has been loaded into the vessel, by applying a magnetic field to the powder. Alternatively, the step (a) may include the steps of preparing a rare-earth alloy powder with remnant magnetization and loading the powder with remnant magnetization into the vessel.

In one preferred embodiment, the steps (b), (c), (d) and (e) are repeatedly carried out in this order a number of times.

In another preferred embodiment, the method may further include the step of (f) stopping the first gas flow once while generating the second gas flow and then stopping the second gas flow while generating the first gas flow again at a flow rate exceeding an average flow rate of the first gas flow in the step (c), thereby crushing the powder layer that has been formed on the base plate. The step (f) may be carried out at least once after the step (e) while the steps (b) through (e) are being carried out repeatedly.

In another preferred embodiment, the rare-earth alloy is an R—Fe—B based alloy.

In another preferred embodiment, the powder has a mean particle size of 1.5 μm to 6 μm.

In another preferred embodiment, the method makes a granulated powder with a mean particle size of 0.05 mm to 3.0 mm.

A method of making a rare-earth alloy sintered body according to the present invention is characterized by including the steps of: making a rare-earth alloy granulated powder by one of the methods described above; filling a cavity with a rare-earth alloy powder, including the granulated powder, without applying any demagnetizing magnetic field to the granulated powder; making a compact by pressing the rare-earth alloy powder, including the granulated powder, with an aligning magnetic field applied thereto; and sintering the compact.

A machine of making a rare-earth alloy granulated powder according to the present invention is characterized by including: a vessel including a base plate for receiving a rare-earth alloy powder; a first channel, which is connected to the vessel so as to produce a first gas flow, going upward from under the base plate, in the vessel; and a second channel, which is connected to the vessel so as to produce a second gas flow, going downward from over the base plate, in the vessel. The machine is also characterized in that the first and second channels are connected to the vessel independently of each other, thereby achieving the object described above.

The machine preferably further includes a temperature controller and a fan within the first channel.

The machine may further include a buffer tank within the second channel.

The machine preferably further includes a control circuit, which includes a thermometer for sensing the temperature of the gas in the vessel and stops the operation of the fan at least when the temperature sensed exceeds a predetermined temperature.

A positive pressure is preferably maintained within the vessel while the machine is operating.

The machine may further include magnetic field generating means for applying a magnetic field to the powder mounted on the base plate.

BRIEF DESCRIPTION OF DRAWINGS

FIG. 1(a) schematically illustrates the structure of a granulated powder according to a preferred embodiment of the present invention, and FIGS. 1(b) and 1(c) schematically illustrate the structures of conventional granulated powders for the purpose of comparison.

BEST MODE FOR CARRYING OUT THE INVENTION

Hereinafter, a method of making a granulated powder and a method of making a rare-earth alloy sintered body according to preferred embodiments of the present invention will be described with reference to the accompanying drawings. In the following description of preferred embodiments, the features of the present invention will be described as being applied to a method of making a sintered magnet of an R—Fe—B based alloy powder prepared by a strip casting process, which exhibits excellent magnetic properties but low flowability. However, the present invention is in no way limited to those specific preferred embodiments. Thus, a rare-earth alloy powder made by any other method may also be used instead.

A method of making an R—Fe—B based alloy sintered body according to a preferred embodiment of the present invention includes the steps of: making an R—Fe—B based alloy powder (which will be referred to herein as a "material powder" or "primary particle powder"); generating remnant magnetization in the material powder; granulating the powder by utilizing agglomeration force produced by the remnant magnetization of the material powder; making a compact by pressing the R—Fe—B based alloy powder, including the granulated powder, with a magnetic field applied thereto; and sintering the compact. By magnetizing the resultant sintered body by a known method, an R—Fe—B based sintered magnet can be obtained. It should be noted that the magnetizing process step may be carried out at any arbitrary point in time after the sintering process. For example, the user of the sintered magnet may perform the magnetizing process step just before he or she uses the sintered magnet. Even a non-magnetized one will also be referred to herein as a "sintered magnet".

In a method of making an R—Fe—B based alloy sintered body according to a preferred embodiment of the present invention, the powder is granulated by utilizing the agglomeration force produced by the remnant magnetization of the material powder. Accordingly, it is possible to either reduce the amount of a granulating agent to be added or use a binder with low binding force than a conventional one. Furthermore, even the addition of the granulating agent itself may be omitted.

Figure 1:
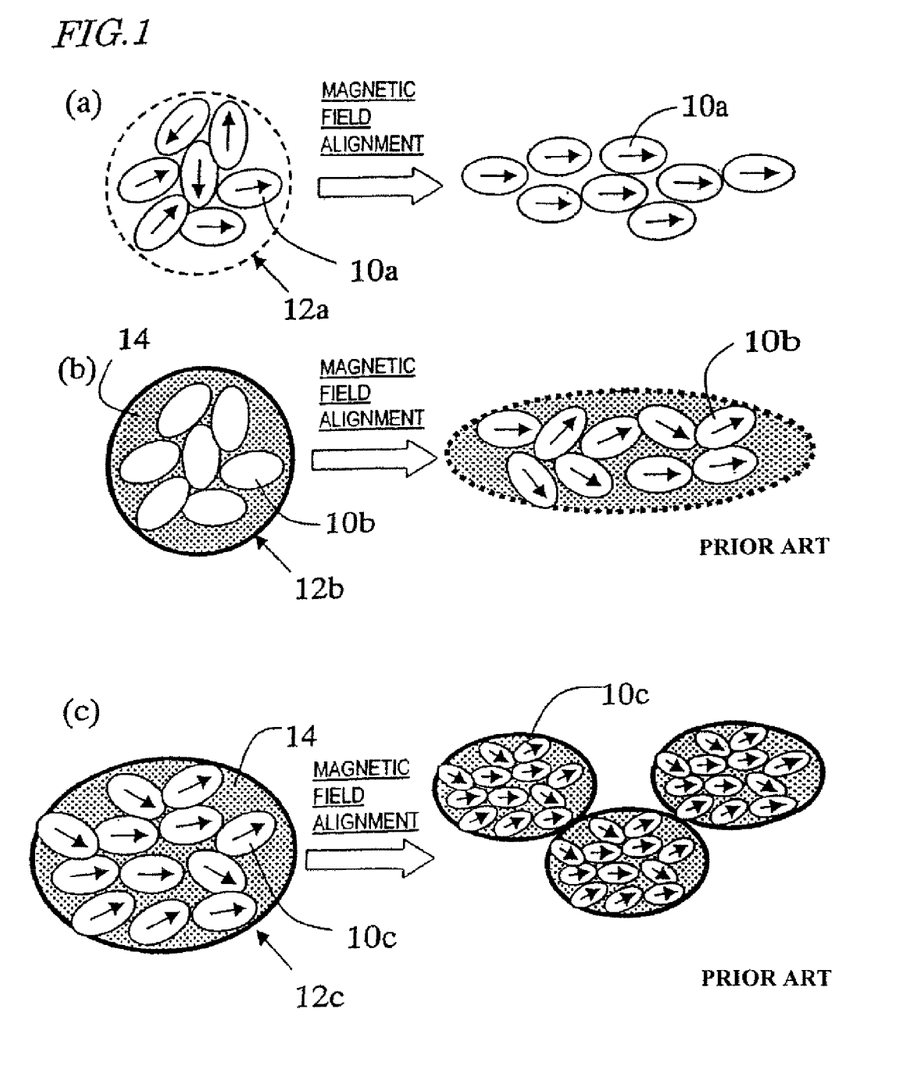

Hereinafter, the features of a granulated powder making method and a resultant granulated powder according to a preferred embodiment of the present invention will be described with reference to FIGS. 1(a), 1(b) and 1(c). On the left-hand side of FIG. 1, illustrated schematically are the structures of respective granulated powders. On the right-hand side of FIG. 1, illustrated schematically are the states of respective granulated powders to which an aligning magnetic field has been applied in a cavity for the purpose of compaction. More specifically, FIG. 1(a) illustrates a granulated powder 12a according to a preferred embodiment of the present invention, FIG. 1(b) illustrates a conventional granulated powder 12b for which a granulating agent has been used, and FIG. 1(c) illustrates a granulated powder 12c obtained by the method described in Japanese Laid-Open Publication No. 10-140202 identified above.

As shown in FIG. 1(a), in the granulated powder 12a of this preferred embodiment, primary particles 10a with remnant magnetization are weakly coupled together via magnetic agglomeration force. In the illustrated example, no granulating agent is supposed to be used. These primary particles 10a with remnant magnetization are magnetically coupled together so as to form a magnetic closed circuit, and the remnant magnetization of the granulated powder 12a is very small (e.g., more than about 0 mT and equal to or smaller than about 10 mT (millitesla)). In this granulated powder 12a, the remnant magnetization of the primary particles 10a is oriented at random unlike the granulated powder 12c shown in FIG. 1(c). The primary particles 10a may have a mean particle size of about 1.5 μm to about 6.0 μm and the granulated powder 12a may have a mean particle size of about 0.05 mm to about 3.0 mm, for example. The remnant magnetization may be measured by inserting a probe of a gauss meter into the granulated powder.

This granulated powder 12a has a moderate particle size and can exhibit excellent flowability. In addition, this granulated powder 12a also has low remnant magnetization and can be loaded into a cavity easily and uniformly without causing any bridging. Furthermore, these primary particles 10a are just coupled together via the magnetic agglomeration force. Accordingly, as shown on the left-hand side of FIG. 1(a), the granulated powder 12a can be broken down into the primary particles 10a just as intended by applying an aligning magnetic field (of about 0.1 T to about 0.8 T, for example) thereto. As a result, the primary particles 10a can be aligned with the magnetic field applied. Also, since the granulated powder 12a includes no granulating agent, the amount of carbon included in the sintered body never increases. A magnet obtained by magnetizing a sintered body made from this granulated powder 12a has substantially the same magnetic properties as a magnet obtained without granulating the material powder (with substantially zero remnant magnetization). That is to say, by using the granulated powder of the preferred embodiment of the present invention, the flowability and compactability can be improved without deteriorating the magnetic properties. Optionally, it is naturally possible to add a granulating agent for the purpose of increasing the strength of the compact, for example. As such a granulating agent is used just as an additional agent, the granulating agent does not have to exhibit strong binding force. Thus, the amount and type of the granulating agent may be selected so as not to deteriorate the magnetic properties.

In contrast, the granulated powder 12b, obtained by binding the primary particles 10b of the material powder together with a granulating agent 14, cannot be sufficiently broken down even under an aligning magnetic field as shown in FIG. 1(b). As a result, the magnetic properties of the resultant sintered magnet deteriorate. Compared with a magnet obtained without granulating the material powder at all, the remnant magnetization of that sintered magnet decreases by about 1% to about 10%. It should be noted that arrows are omitted from the primary particles 10b of the granulated powder 12b shown in FIG. 1(b) because the particles 10b have no remnant magnetization.

Furthermore, if a granulated powder 12a is obtained by binding and fixing primary particles 10c together with a granulating agent 14 while aligning the primary particles 10c under a static magnetic field as shown in FIG. 1(c), then the deterioration in magnetic properties can be minimized but the granulated powder 12c cannot be fully broken down into the primary particles 10c. Accordingly, compared with a magnet obtained without granulating the material powder at all, the remnant magnetization of the resultant sintered magnet decreases by about one to several percent. Also, as schematically illustrated in FIG. 1(c), the granulated powder 12c is elongated in the directions of the magnetic poles, which is disadvantageous in terms of flowability. Furthermore, since the granulated powder 12c has relatively large remnant magnetization, the granulated powder 12c will produce bridging and cannot be loaded into a cavity unless demagnetized once.

In contrast, the granulated powder 12a of the preferred embodiment of the present invention is almost spherical in shape, has too small remnant magnetization to require any demagnetization, and can be loaded into a cavity easily and uniformly. Accordingly, a so-called "measuring-and-loading technique", in which a predetermined mass of granulated powder is measured in advance and then loaded into a cavity, can be adopted. As described above, the granulated powder 12a of the preferred embodiment of the present invention can exhibit excellent flowability and cavity-filling ability and can contribute to making a sintered magnet substantially without deteriorating the magnetic properties.

A granulated powder according to a preferred embodiment of the present invention is obtained by a granulating method including the steps of giving kinetic energy to particles of a material powder with remnant magnetization and allowing the particles to grow under a tumbling action produced by the kinetic energy given. Optionally, a granulating agent may be added if necessary.

In a method of making a granulated powder according to a preferred embodiment of the present invention, the step of generating remnant magnetization in the material powder may be carried out either before the material powder is loaded into the vessel of a granulating machine (i.e., a granulating vessel) or after the material powder has been prepared (or loaded) in the vessel. However, the primary particles 10a of the granulated powder 12a of this preferred embodiment are just coupled together under magnetic agglomeration force produced by the remnant magnetization. Accordingly, the granulated powder 12a is broken down upon the application of an external magnetic field. For that reason, the particles are allowed to grow under a substantially zero magnetic field. This is contrary to the method of making the granulated powder 12c shown in FIG. 1(c) in which a magnetic field needs to be applied continuously to align the primary particles 10c until the granulated powder 12 is definitely fixed with the granulating agent 14. As used herein, the "substantially zero magnetic field" refers to a magnetic field which is weak enough to obtain a granulated powder where a magnetic closed circuit has been formed by the remnant magnetization of the powder and to have no effects on the remnant magnetization of the powder.

The magnetic field to be applied to generate remnant magnetization may be any of various magnetic fields. Since the primary particles may have a little remnant magnetization, an alternating demagnetizing field is preferably used. However, the magnetic field to generate remnant magnetization does not have to be such an alternating demagnetizing field but may also be a monotonically demagnetizing field, another type of pulse magnetic field or a static magnetic field.

It should be noted that even after the remnant magnetization has been generated, a material powder with low coercivity might lose the magnetization and the shape of the granulated powder before the final granulated powder is obtained. For that reason, the material powder preferably has relatively high coercivity. Specifically, if the coercivity value of a material powder, which has been loaded into a container so as to have a tap density of 2.0 g/cm$^3$, is measured by a BH tracer as the apparent coercivity of the material powder, the material powder preferably has a coercivity of at least 70 kA/m, more preferably 80 kA/m or more. For example, an R—Fe—B based alloy preferably includes at least 2 mass % of Dy, at least 1 mass % of Tb or at least 1 mass % of Dy and Tb combined.

Considering the flowability and compactability, the R—Fe—B based alloy powder to be pressed and compacted preferably consists of only the granulated powder prepared as described above. Alternatively, a mixture of the granulated powder and the material powder (i.e., powder of primary particles) may also be used. However, as the percentage of the material powder increases, the flowability decreases. Accordingly, to improve the flowability sufficiently effectively by the granulating technique, the alloy powder preferably consists essentially of the granulated powder alone. Also, when the mixture of the material powder and the granulated powder is used, the surface of the material powder particles is preferably coated with a lubricant. By coating the surface of the primary particles with a lubricant, the flowability of the R—Fe—B based powder can be improved and the oxidation thereof can be prevented as well. Furthermore, in pressing the powder under a magnetic field, the powder particles can also be aligned more easily. It should be noted that not only a powder consisting essentially of a rare-earth alloy alone (possibly with a surface oxide layer) but also a powder, including a granulating agent and/or a lubricant as well as the rare-earth alloy powder and being subjected to the compaction process, will be referred to herein as "rare-earth alloy powders".

Hereinafter, a method for making a magnet from an R—Fe—B based alloy sintered body according to a preferred embodiment of the present invention will be described step by step.

First, flakes of an R—Fe—B based alloy are made by a strip casting process (see U.S. Pat. No. 5,383,978, for example). Specifically, an R—Fe—B based alloy, prepared by a known method, is melted by an induction heating process to obtain a molten alloy. The R—Fe—B based alloy may also have the composition disclosed in U.S. Pat. No. 4,770,723 or U.S. Pat. No. 4,792,368. In a typical composition of the R—Fe—B based rare-earth alloy, Nd or Pr is usually used as R, a portion of Fe may be replaced with a transition element (e.g., Co), and a portion of B may be replaced with C.

This molten alloy is maintained at 1,350° C. and then rapidly quenched on a single roller under the conditions including a roller peripheral velocity of about 1 m/s, a cooling rate of 500° C./s and an undercooling of 200° C., thereby obtaining alloy flakes with a thickness of 0.3 mm. By decrepitating these alloy flakes by a hydrogen occlusion process, an alloy coarse powder is obtained. Then, this alloy coarse powder is finely pulverized by a jet mill within a nitrogen gas atmosphere, thereby obtaining an alloy powder (i.e., material powder) with a mean particle size of 1.5 μm to 6 μm and a specific surface area of about 0.45 m$^2$/g to about 0.55 m$^2$/g as measured by a BET method. This material powder has a true density of 7.5 g/cm$^3$.

Next, remnant magnetization is generated in the material powder obtained in this manner. In this example, an alternating demagnetizing field with a peak magnetic field of 1.0 T is applied thereto.

Subsequently, the material powder with remnant magnetization is granulated. In this example, a fluid-bed granulating technique is adopted. According to the fluid-bed granulating technique, a granulated powder in a quasi-spherical shape and with adequate hardness can be obtained. When the granulated powder has such an almost spherical shape, excellent flowability and compactability are achieved. Also, the hardness of the granulated powder is also changeable with the granulating agent. However, inconveniences are caused if the granulated powder is too hard or too soft as described above.

Figure 2:
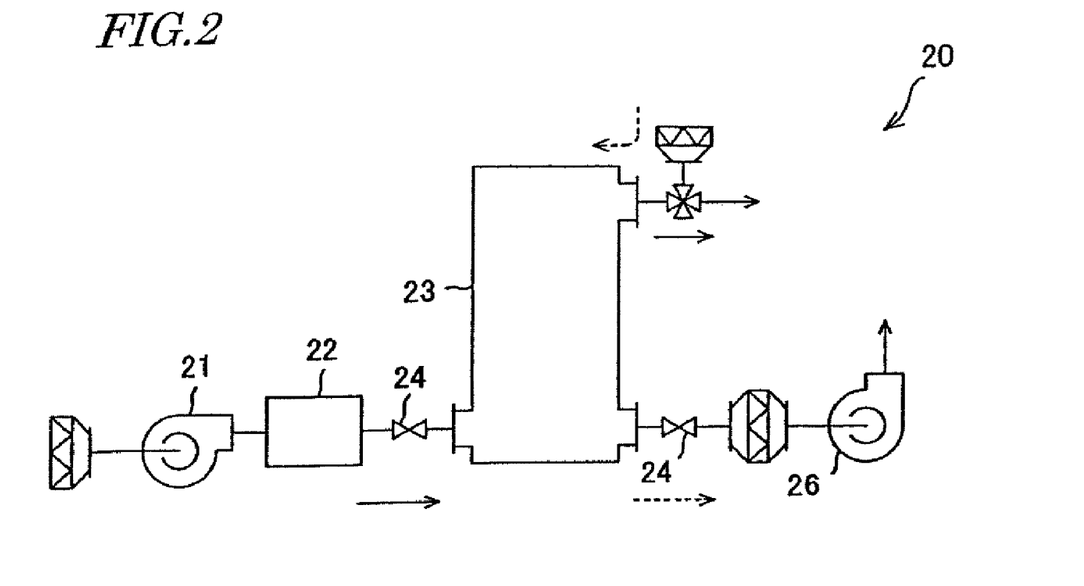
FIG. 2 schematically illustrates a granulating machine 20 for making an R—Fe—B based alloy granulated powder according to a preferred embodiment of the present invention.

A known granulating machine 20 for granulating a powder by the fluid-bed granulating process is schematically illustrated in FIG. 2. The granulating machine 20 includes a fanning blower 21, a temperature and humidity controller 22, a fluid vessel 23, switch valves 24, and a reversing blower 26. A swing processor produced by Fuji Paudal Co., Ltd. is preferably used as such a granulating machine 20.

First, normal fluidization is carried out in the fluid vessel 23 using an airflow being produced by the fanning blower 21. In this case, the airflow goes under a positive pressure in the direction indicated by the solid arrows (fluidizing process step). Next, when the switch valves 24 are turned, the direction of the airflow is reversed by the reversing blower 26 to the direction indicated by the dashed arrows (consolidating process step). In this consolidating process step, a powder layer is formed and compressed and the hardness of the granulated powder is increased by the downward airflow. In the fluidizing process step on the other hand, the powder layer formed in the consolidating process step is broken by the upward airflow, and a granulated powder with an almost spherical shape is produced under the milling action of the fluidized air. The switch valves 24 may be turned repeatedly. By controlling the air volume and repeating cycles, the hardness of the granulated powder can be adjusted. Also, by controlling the time of the granulating process, the mean particle size of the granulated powder can also be adjusted.

In the conventional fluid-bed granulating process, the process step of fluidizing (or also called "rectifying the flow of") a powder with an upward gas flow in a vessel (i.e., fluidizing process step) and the process step of compressing a powder layer by a downward gas flow (i.e., consolidating process step) are carried out separately. For example, the fluidizing and compressing machine disclosed in Japanese Patent No. 3019953 (see FIG. 3) is designed so as to switch a gas flow for performing the fluidizing process step (which will be referred to herein as a "first gas flow") into a gas flow for performing the consolidating process step (which will be referred to herein as a "second gas flow"), or vice versa. Thus, the conventional machine cannot generate both of these gas flows at the same time within the vessel.

The present inventors discovered and confirmed via experiments that a rare-earth alloy granulated powder could be produced much more efficiently by supplying the first gas flow for performing the fluidizing process step and the second gas flow for performing the consolidating process step into the vessel at the same time.

This is believed to be because the rare-earth alloy has a relatively heavy absolute specific gravity of 7.5 g/cm$^3$ and/or because the granulated powder is produced by utilizing a relatively weak force such as remnant magnetization. This is based on the results of experiments that when no binder was used, the production yield of the granulated powder decreased unless the consolidating process step was carried out after the first and second gas flows were allowed to be present within the same vessel but that when a binder was used, no difference was sensed between the conventional and inventive methods. However, it is not quite clear why the granulated powder can be produced more efficiently when the first and second gas flows are allowed to be present at the same time.

Hereinafter, a method and machine of making a granulated powder according to a preferred embodiment of the present invention will be described in detail with reference to FIGS. 3 and 4.

Figure 3:
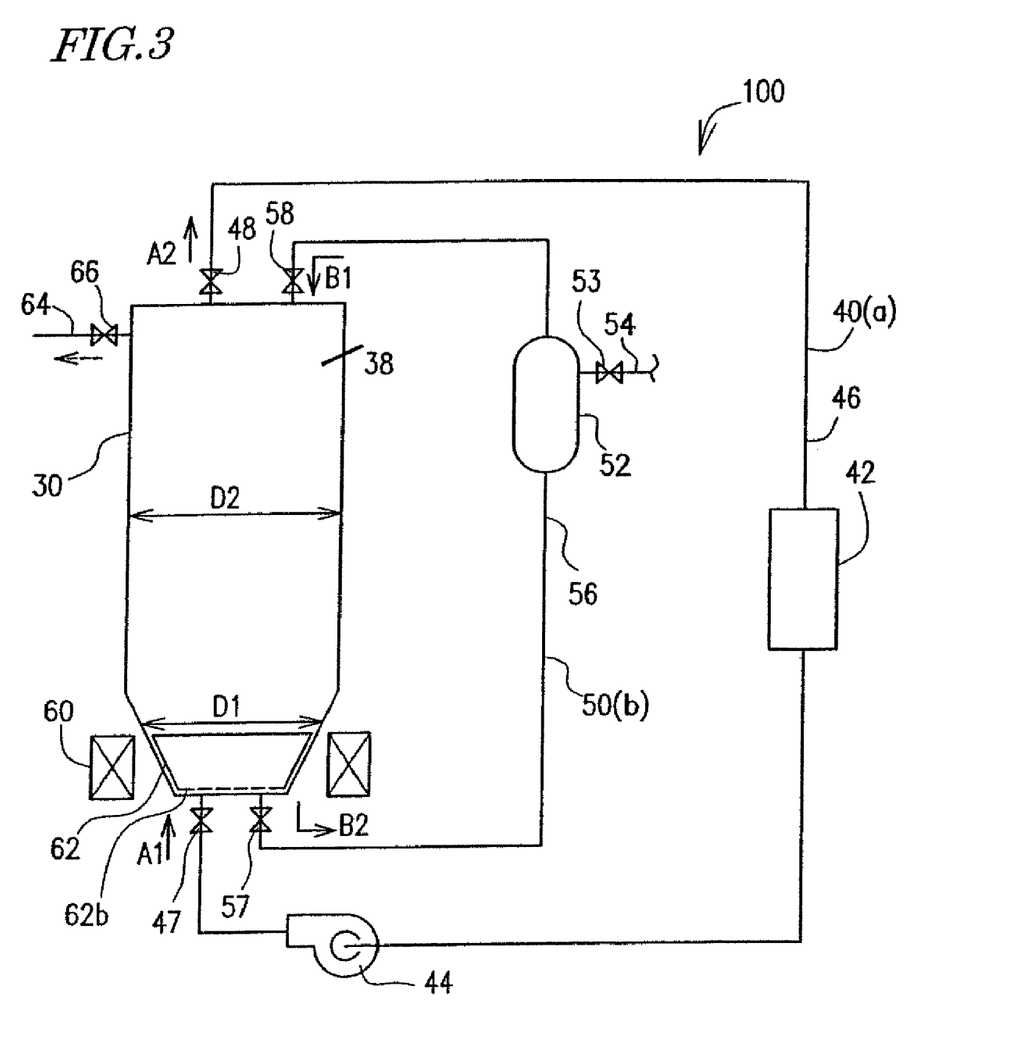
FIG. 3 schematically illustrates a granulating machine 100 for making an R—Fe—B based alloy granulated powder according to another preferred embodiment of the present invention.
Figure 4:
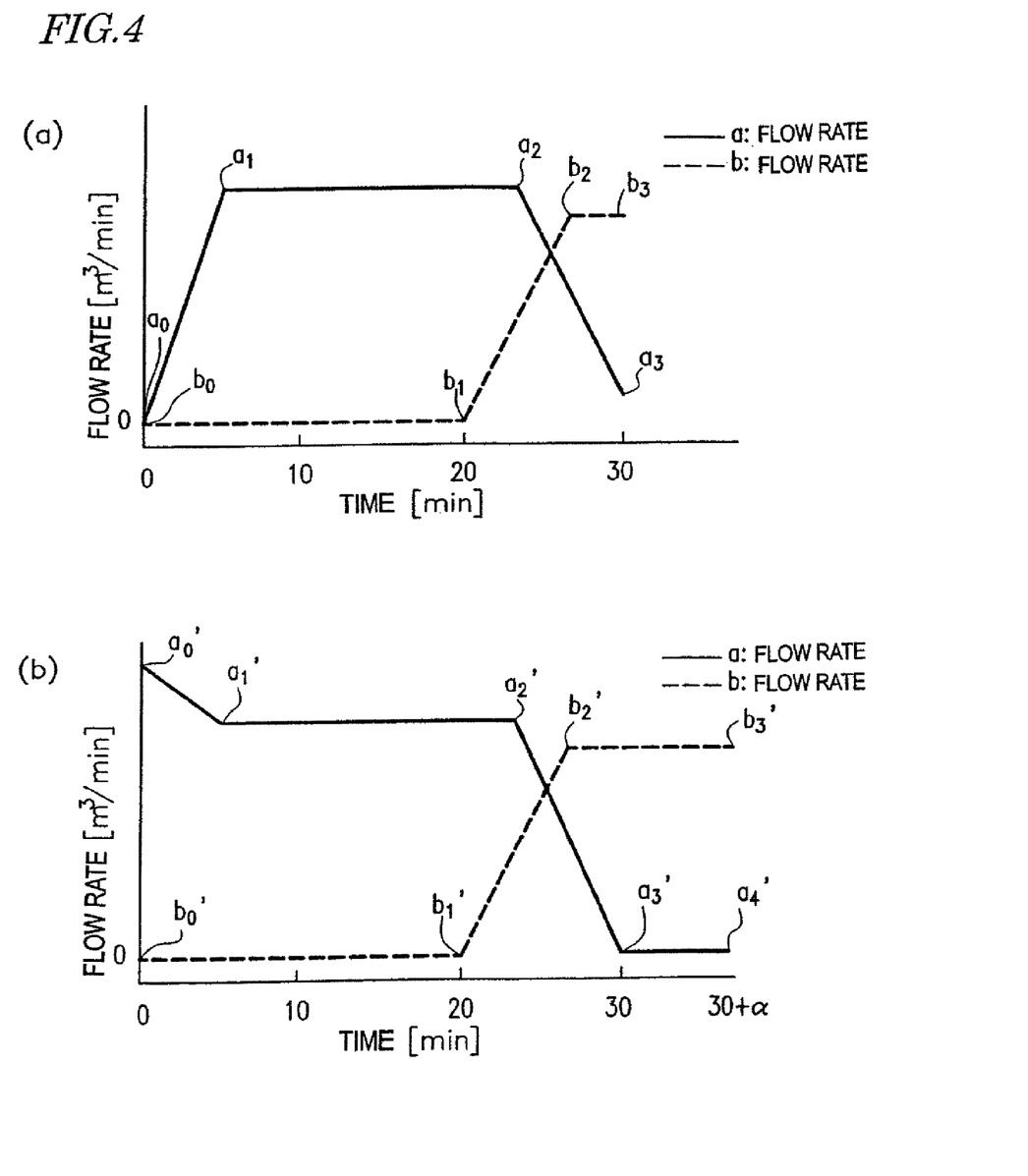
FIGS. 4(a) and 4(b) are graphs schematically showing how (the flow rates of) gas flows in a vessel change (with time) in a method of making a granulated powder according to a preferred embodiment of the present invention.

FIG. 3 schematically illustrates a configuration for a granulated powder producing machine 100, which can be used effectively in a method of making a granulated powder according to a preferred embodiment of the present invention. FIGS. 4(*a*) and 4(*b*) are graphs schematically showing how (the flow rates of) gas flows in a vessel change (with time) in a method of making a granulated powder according to a preferred embodiment of the present invention.

The granulated powder producing machine 100 shown in FIG. 3 includes a vessel (fluidizing vessel) 30, a first channel 40(*a*), which is connected to the vessel 30 and can produce the first upward gas flow in the vessel 30, and a second channel 50(*b*), which is also connected to the vessel 30 and can produce the second downward gas flow in the vessel 30. The first and second channels 40(*a*) and 50(*b*) are connected to the vessel 30 independently of each other. It should be noted that the reference numerals 40 and 50 will be used mainly to represent the physical structures of the first and second channels, while the reference signs a and b will be used mainly to represent the gas flow paths of the first and second channels.

The vessel 30 has such a structure as receiving a container 62, filled with a rare-earth alloy powder, at the bottom. The bottom plate (or base plate) 62*b* of the container 62 has air permeability and may be made of a net or cloth, for example. In view of work efficiency, such a container 62 is preferably used. However, any other structure may also be adopted as long as the vessel 30 includes the base plate with air permeability.

The rare-earth alloy powder mounted on the bottom plate 62*b* of the container 62 is given kinetic energy by the first gas flow, going upward from under the bottom plate 62*b*, so as to be fluidized. In this case, the rare-earth alloy powder is granulated under a substantially zero magnetic field by utilizing the agglomeration force produced by the remnant magnetization of the rare-earth alloy powder and a tumbling action produced by the kinetic energy that has been given to the powder by the first gas flow. Also, a powder layer is formed on the bottom plate 62*b* due to the weight of the powder itself and/or the second gas flow, and then compressed by the second gas flow, thereby consolidating the powder.

The first channel 40 includes a temperature controller 42, a fan (e.g., a fanning blower) 44, and piping 46, and is connected (or coupled) to the vessel 30 by way of valves 47 and 48, thereby defining the first channel a that circulates the gas within the vessel 30 (see the arrows A1 and A2 shown in FIG. 3). To minimize the oxidation of the rare-earth alloy powder, an inert gas (such as a rare gas or a nitrogen gas) is preferably used. In this example, a nitrogen gas is used. It should be noted that the volume fraction of oxygen gas to the overall gas is preferably controlled at 0.1% or less.

Also, if the rare-earth alloy powder has an excessively high temperature, then the coercivity and the agglomeration force of the powder both decrease so much that the granulated powder cannot be produced easily. In order to avoid such a situation and/or minimize the oxidation of the rare-earth alloy powder, the gas temperature is preferably controlled so as to fall within the range of 10° C. to 40° C., more preferably within the range of 20° C. to 30° C. Optionally, a humidity controller for removing water from the gas may also be provided if necessary.

The fan 44 produces the first gas flow from the gas that has had its temperature controlled by the temperature controller 42. The flow rate of the first gas flow produced within the vessel 30 is controlled by adjusting the output of the fan 44 and/or the degree of opening of the valve 47.

The second channel 50 includes a buffer tank 52 and piping 36, and is connected (or coupled) to the vessel 30 by way of valves 57 and 58, thereby defining the second channel b that circulates the gas within the vessel 30 (see the arrows B1 and B2 shown in FIG. 3). It should be noted that the buffer tank 52 is connected to a main pipe (e.g., factory nitrogen gas pipe) 54 by way of a regulator 53. The nitrogen gas supplied to the source pipe 34 may have a pressure of about 7 kg/cm$^2$, which is decreased by the regulator 33 to several kg/cm$^2$. The flow rate of the second gas flow produced within the vessel 30 is controlled by adjusting the degrees of opening of the valves 57 and 58.

Both ends of the first channel 40 and both ends of the second channel 50 are all connected to the vessel 30 such that the gas flow path is substantially closed. Accordingly, the states (e.g., temperature and humidity) of the nitrogen gas in the vessel 30 can be controlled efficiently and the consumption of the nitrogen gas can also be reduced. Nevertheless, if the system was fully closed, it would be difficult to control the gas flows. For that reason, a configuration for exhausting the nitrogen gas from the vessel 30 with a predetermined resistance is preferably adopted by connecting an exhaust pipe 64 to the vessel 30 by way of a valve 66. In this case, the resistance of the exhaust pipe 64 is preferably controlled such that the pressure inside of the vessel 30 is kept higher than the pressure outside of the vessel 30 (i.e., the atmospheric pressure) at least during the operation.

Furthermore, the rare-earth alloy powder is easily oxidizable. Accordingly, if the temperature of the rare-earth alloy powder rose unusually, then the rare-earth alloy powder could even explode. For that reason, a thermometer 38 for sensing the temperature inside of the vessel 30 is preferably provided. And a control circuit is preferably provided in order to stop the operation of at least the fan 44 when the temperature inside of the vessel 30 exceeds a predetermined temperature. Optionally, the valves 47, 48, 57, 58 and 66 may be solenoid valves and may be controlled so as to close themselves when the temperature inside of the vessel 30 exceeds the predetermined temperature. According to the results of various experiences, when an R—Fe—B based alloy is used, rapid oxidation (possibly with firing or explosion) is very likely to occur at a temperature exceeding 50° C. For that reason, the temperature to start the stop operation is preferably set to 50° C.

In the vessel 30, the inside diameter at and around the bottom portion to receive the container 62 is different from that at the body portion located over the bottom portion. As shown in FIG. 3, the inside diameter D1 of the bottom portion of the vessel 30 is smaller than the inside diameter D2 of the body portion thereof. And the closer to the body portion, the larger the inside diameter. When the vessel 30 having such a structure is used, the flow velocity of the first gas flow produced by the first channel 40 in the vessel 30 decreases upward. Accordingly, the powder being floated on the first gas flow can be dropped efficiently. The bottom portion, having the inside diameter that is smaller than the inside diameter D2 of the body portion, has a length (or height) accounting for approximately 20% of the overall length of the vessel 30. The minimum inside diameter D1 of the bottom portion (i.e., the inside diameter of the portion on which the bottom plate 62b is located) may be approximately 50% of D2, for example.

The granulated powder producing machine 100 further includes magnetic field generating means 60, which can apply a magnetic field to the rare-earth alloy powder loaded in the container 62. The magnetic field generating means 60 may be an electromagnet including a coil and a yoke and is preferably able to generate an alternating demagnetizing field. If a rare-earth alloy powder with remnant magnetization generated outside of the vessel 30 is used, then the magnetic field generating means 60 may be naturally omitted.

Next, it will be described with reference to FIGS. 4(a) and 4(b) how the gas flows in the vessel 30 change their states in the process of making a granulated powder according to a preferred embodiment of the present invention. Specifically, FIG. 4(a) shows a series of process steps (corresponding to one cycle) from the start point of the operation, while FIG. 4(b) shows a series of process steps (corresponding to one cycle) including a crushing process step.

First, it will be described with reference to FIG. 4(a) what the state of the gas flow in the vessel 30 will be after the container 62, filled with a rare-earth alloy powder with remnant magnetization, has been set at a predetermined position in the machine 100.

When the container 62 is set, the flow rate $a_0$ of the first gas flow a and the flow rate $b_0$ of the second gas flow b are both zero. Then, the temperature controller 42 and fan 44 are turned ON and the valves 47 and 48 are opened, thereby producing the first gas flow a in the vessel 30. The flow rate of the first gas flow a increases gradually to reach a steady-state flow rate $a_1$ soon. In such a state, the powder is granulated under the agglomeration force produced by the remnant magnetization while being subjected to a tumbling action in the vessel 30. In the meantime, part of the powder located around the center of the vessel 30 (including particles being granulated) is floated on the first gas flow a against the gravitational force, while another part of the powder located around the inner wall of the vessel 30, where the flow velocity is low, drops due to its own weight.

With the flow rate of the first gas flow a kept substantially constant for a predetermined amount of time (e.g., about 20 minutes), the valves 57 and 58 are opened to start to produce the second gas flow b (of which the flow rate at the start point is b1). The flow rate of the second gas flow b is increased gradually. But before the flow rate of the second gas flow b reaches its steady-state flow rate $b_2$, the flow rate of the first gas flow a starts being decreased (of which the flow rate at the start point is $a_2$). That is to say, there is a period in which the flow rate of the first gas flow a is decreased while that of the second gas flow b is increased (i.e., the period between $a_2$ and $b_2$ shown in FIG. 4(a)). By allowing the first and second gas flows a and b to be present in the same vessel 30 for some period of time in this manner, the rare-earth alloy granulated powder can be produced more efficiently. The reason is not quite clear. But it seems that if the first gas flow a was stopped abruptly or if the flow rate of the second gas flow b was too much higher than that of the first gas flow a, then the granulated powder would drop so fast that the granulated powder should be broken into pieces due to the impact. Also, if the second gas flow b started to be produced after the first gas flow a has been stopped completely, then a negative pressure would be produced in the vessel 30, thus making it rather difficult to control the pressure, which is not beneficial.

As described above, if the flow rate of the second gas flow b is increased while the flow rate of the first gas flow a is decreased gradually, then the granulated powder will never be broken into pieces due to the impact it will receive on dropping on the bottom plate 62b but will form a powder layer thereon. Thereafter, the powder layer will be compressed and consolidated by the second gas flow b. As a result of this consolidation process, the hardness of the granulated powder increases.

By repeating the cycle shown in FIG. 4(a), a granulated powder with an adequate hardness can be obtained. It should be noted, however, that the flow rate of the first gas flow a at the start point of the second and following cycles does not have to be zero ($a_0$) as shown in FIG. 4(a) but may be equal to the flow rate $a_3$ at the end point of the cycle shown in FIG. 4(a).

However, just by repeating the cycle shown in FIG. 4(a), the powder layer that has been compressed on the bottom plate 62b could not be crushed sufficiently and particles with excessive particle sizes might be produced. Accordingly, to crush the powder layer with more certainty, the cycle shown in FIG. 4(b) is preferably carried out.

Hereinafter, the process steps to be done from the point $b_1'$ shown in FIG. 4(b) on will be described. In the following example, the process steps to be done by the point $b_1$ shown in FIG. 4(a) are also carried out up to this point $b_1'$ shown in FIG. 4(b) and then the process steps shown in FIG. 4(b) are carried out.

The second gas flow b starts being produced (at a flow rate $b_1'$ at the start point) just as described above. Before the flow rate of the second gas flow b reaches its steady-state flow rate $b_2'$, the flow rate of the first gas flow a starts being decreased (from a flow rate $a_2'$ at the start point). Thereafter, the valves 47 and 48 are closed to keep the first gas flow a stopped (for a minutes between the points in time $a_3'$ and $a_4'$ shown in FIG. 4(a)). If the fan 44 was kept operated in the meantime, then a portion of the piping 46 between the fan 44 and the valve 47 would have an increased gas pressure. Stated otherwise, the valve 47 should be closed until a predetermined pressure to crush the powder layer can be obtained. Then, the second gas flow b is stopped by closing the valves 57 and 58 (at the point $b_0'$ shown in FIG. 4(b)) and the first gas flow a is produced by opening the valves 47 and 48 (at the point $a_0'$ shown in FIG. 4(b)). In this case, the flow rate $a_0'$ of the first gas flow a produced in the vessel 30 exceeds the steady-state flow rate $a_1$ (=$a_2$) of the first gas flow a shown in FIG. 4(a), thus making it possible to crush the powder layer efficiently. The flow rate of the first gas flow a to cause the tumbling action is typically kept substantially constant ($a_1$=$a_2$) as shown in FIG. 4(a) but may also be variable. In that case, the flow rate of the first gas flow a to crush the powder layer is preferably higher than the average flow rate of the first gas flow a to cause the tumbling action.

In the example described above, the first gas flow a with the flow rate $a_0'$ is produced by operating the valves 57 and 58. Alternatively, the flow rate of the first gas flow a may be adjusted by controlling the blowing ability of the fan 44. Or the blowing ability control may be combined with the valve control as well. It should be noted that the flow rates $a_1'$ and $a_2'$ shown in FIG. 4(b) may be respectively equal to the flow rates $a_1$ and $a_2$ shown in FIG. 4(a).

If the size of a granulated powder to be formed by utilizing remnant magnetization reaches a certain level, then a magnetic closed circuit is created and the magnetic attraction between the particles of the granulated powder weakens. In that case, the crushing cycle shown in FIG. 4(b) is no longer needed. Accordingly, in a process in which a predetermined granulated powder can be obtained by repeatedly performing the basic cycle shown in FIG. 4(a) and the crushing cycle shown in FIG. 4(b) thirty times in total, for example, 5 to 10 crushing cycles are preferably included in the first 20 cycles.

It should be noted that if such a material powder with remnant magnetization is used, a predetermined granulated powder can be obtained in a shorter time than (e.g., in approximately half as long a time as) a situation where a material powder with no remnant magnetization is used. This is believed to be because when such a material powder with remnant magnetization is used, the nucleus to make the granulated powder is easily produced by the magnetic agglomeration force between the primary particles.

The granulated powder preferably has a mean particle size of 0.05 mm to 3.0 mm. A normal granulated powder includes few primary particles and a very small number of tertiary and other high-order particles. Thus, the mean particle size of secondary particles can be regarded as substantially representing the mean particle size of the granulated powder. In this example, the mean particle size of secondary particles obtained by microscopy is used as the mean particle size of the granulated powder. If the granulated powder has a mean particle size smaller than 0.05 mm, then the flowability cannot be improved so significantly and a uniform compact with a sufficient density is hard to obtain. However, if the granulated powder has a mean particle size greater than 3 mm then the cavity-filling ability will decrease and a uniform compact with a sufficient density is hard to obtain, too. The granulated powder more preferably has a mean particle size of 0.1 mm to 2.0 mm.

Next, a compact is made by pressing and compacting the granulated powder obtained in this manner. In this example, a compact is made of the granulated powder only. The compaction process may be carried out with a known press machine. Typically, a uniaxial press machine for pressing a powder in a die cavity (or die hole) with upper and lower punches is used. The granulated powder may be transported on a batch-by-batch basis with a highly airtight container filled or supplied with a nitrogen gas, for example.

The granulated powder is loaded into the die cavity of a uniaxial press machine. The process step of loading the granulated powder into the cavity may be carried out either with a sieve or with a feeder box as disclosed in Japanese Patent Gazette for Opposition No. 59-40560, Japanese Laid-Open Publication No. 10-58198, Japanese Utility Model Publication No. 63-110521 or Japanese Laid-Open Publication No. 2000-248301. The methods disclosed in these documents will be collectively referred to herein as "drop-off methods".

Particularly in making a small compact, the granulated powder is preferably measured with the cavity to the amount corresponding to the content volume of the cavity. For example, a feeder box having an opening at the bottom may be shifted to over the cavity so as to let the granulated powder fall gravitationally (i.e., by itself) and then the excess of the granulated powder that has overflowed the cavity is sliced off. In this manner, a predetermined amount of granulated powder can be loaded relatively uniformly. It is naturally possible to measure the granulated powder separately and then load it into the cavity with a funnel, for example.

After the cavity has been filled with the granulated powder in this manner, the upper punch of the uniaxial press machine is lowered so as to close the cavity opening. Then, an aligning magnetic field is applied thereto, thereby breaking the granulated powder down into primary particles and aligning the primary particles with the magnetic field applied. The granulated powder of this preferred embodiment of the present invention can be broken down into primary particles just as intended at a relatively weak magnetic field of 0.1 T to 0.8 T. However, to achieve a sufficient degree of alignment, a magnetic field of about 0.5 T to about 1.5 T is preferably applied. The direction of the magnetic field may be perpendicular to the pressing direction, for example. The powder is pressed uniaxially between the upper and lower punches under a pressure of 98 MPa, for example, with the magnetic field applied in this manner. As a result, a compact with a relative density (i.e., the ratio of the compact density to the true density) of 0.5 to 0.7 can be obtained. If necessary, the direction of the magnetic field may be parallel to the pressing direction.

Next, the resultant compact is sintered at a temperature of about 1,000° C. to about 1,180° C. for approximately 1 hour to approximately 6 hours within a vacuum or an inert atmosphere. The granulated powder of this preferred embodiment includes either no granulating agent at all or so small an amount of granulating agent as to be substantially removable as a result of the sintering process. Thus, there is no need to separately provide any binder removal process. It should be noted that a conventional typical binder removal process is carried out at a temperature of about 200° C. to about 800° C. for approximately 3 hours to approximately 6 hours within an inert atmosphere with a pressure of about 2 Pa.

Then, the resultant sintered body is subjected to an aging treatment at a temperature of about 450° C. to about 800° C. for approximately 1 hour to approximately 8 hours, thereby obtaining an R—Fe—B based sintered magnet. Thereafter, an R—Fe—B based sintered magnet is completed as a final product by magnetizing it at an arbitrary stage.

According to the present invention, a granulated powder with excellent flowability and compactability is used as described above. Thus, the granulated powder can be loaded into the cavity highly uniformly with the variation in the loaded amount minimized. Consequently, the mass and dimensions of compacts obtained by the compaction process are variable just slightly. The compacts rarely crack or chip, either.

Furthermore, in the granulated powder of this preferred embodiment, the primary particles thereof are just coupled together substantially under the magnetic agglomeration force produced by remnant magnetization. Accordingly, by applying an aligning magnetic field thereto, the granulated powder can be broken down into the primary particles just as intended. Thus, the degree of alignment of the primary particles never decreases. Furthermore, the deterioration in magnetic properties, which could be caused if carbon of the granulating agent remained in the sintered body, can also be minimized. As a result, a sintered magnet with excellent magnetic properties can be obtained. Consequently, according to the present invention, a quality R—Fe—B based alloy sintered magnet can be produced at high productivity.

EXAMPLES

Hereinafter, specific examples of the present invention will be described.

An R—Fe—B based alloy powder was made in the following manner. A molten alloy was prepared by using ferroboron alloy including electrolytic iron with a purity of 99.9% and 19.8 mass % of B, and Nd and Dy with purity of 99.7% or more as respective start materials. Flakes of an R—Fe—B based alloy, having a composition including 30.0 mass % of Nd, 5.0 mass % of Dy, 64.0 mass % of Fe and 1.0 mass % of B, were obtained from this molten alloy by a strip casting process. These alloy flakes were finely pulverized by using a jet mill within an inert gas (e.g., $N_2$ gas with a gas pressure of 58.8 MPa), thereby making a material powder with a mean particle size of 3 μm.

Next, remnant magnetization was generated in the material powder of this specific example by applying an alternating demagnetizing field (with a peak magnetic field of 1.0 T) thereto.

Subsequently, a granulated powder was prepared by a fluid-bed granulating process (using a swing processor produced by Fuji Paudal Co., Ltd., for example). In making granulated powders representing Examples Nos. 2 and 3 and Comparative Examples Nos. 2 and 3, polybdenum and isoparaffin were used as granulating agents as disclosed by the applicant of the present application in Japanese Patent Application No. 2001-96572. In each of the specific examples of the present invention and comparative examples, the various conditions were defined such that the resultant granulated powder should have a mean particle size of 0.5 mm. The granulated powder thus obtained had a remnant magnetization of about 0.2 mT. In Examples Nos. 1, 2 and 3, it took approximately 15 minutes to carry out the granulating process step. In Comparative Examples Nos. 2 and 3 on the other hand, it took approximately 30 minutes to complete the granulating process step. It should be noted that the material powder (to which no magnetic field had been applied) was used as it was in Comparative Example No. 1 without being granulated. The following Table 1 summarizes the conditions under which the powders to be pressed were prepared in Examples Nos. 1, 2 and 3 and Comparative Examples Nos. 1, 2 and 3:

TABLE 1

| Powder to be pressed | Granulated? | Remanent Magnet-ization | Granulating Agent | Approx. rest Angle |
| --- | --- | --- | --- | --- |
| Example 1 | Yes | Yes | 0 mass % | about 47 degrees |
| Example 2 | Yes | Yes | 1 mass % | about 46 degrees |
| Example 3 | Yes | Yes | 2 mass % | about 44 degrees |
| Comp. Ex. 1 | No | No | 0 mass % | about 52 degrees |
| Comp. Ex. 2 | Yes | No | 1 mass % | about 49 degrees |
| Comp. Ex. 3 | Yes | No | 2 mass % | about 44 degrees |

Table 1 also shows the rest angles of the respective powders to be pressed. A powder with a large rest angle has bad flowability. Thus, the smaller the rest angle, the higher the flowability. In Comparative Example No. 1, unless the material powder was granulated, the rest angle was as large as about 52 degrees and the flowability was bad. In contrast, in each of Examples Nos. 1, 2 and 3 and Comparative Examples Nos. 2 and 3 in which the powders were granulated, the rest angle decreased to less than 50 degrees. Among other things, the powders to be pressed representing Examples Nos. 1 and 2 had smaller rest angles and exhibited better flowability than the powder to be pressed representing Comparative Example No. 2 (to which 1 mass % of granulating agent was added). That is to say, it can be seen that by taking advantage of remnant magnetization, the flowability can be improved even when a smaller amount of granulating agent is added than the conventional one. It should be noted that in Example No. 3 and Comparative Example No. 3 in which the granulating agent was added at 2 mass %, no difference was sensed in flowability.

Each of the powders to be pressed shown in Table 1 was loaded into a cavity with a length of 20 mm, a width of 15 mm and a depth of 10 mm by the method using a feeder box as described above and then pressed and compacted uniaxially (under a pressure of 98 MPa and with an aligning magnetic field of 0.8 T applied perpendicularly to the pressing direction). These loading and compacting process steps were carried out under the same conditions for all of the examples of the present invention and comparative examples. It should be noted that compacts with various compact densities (i.e., green densities) were obtained with the pressing conditions changed.

A variation (%) in mass and a variation (σ) in fill density among the resultant compacts were estimated for Example No. 1 and Comparative Example No. 1. The variation in mass among the compacts was calculated as {(maximum mass−minimum mass)/average mass (n=50)}×100(%). Also, the variation (σ) in fill density represents a standard deviation of the mass distribution of 50 compacts. In Example 1, the variation in mass among the compacts was about 5%, which was significantly lower than the variation in mass of about 15% in Comparative Example No. 1. This tendency was also observed in the variation (σ) in fill density. Specifically, the variation (σ) in fill density in Comparative Example No. 1 was about 0.33, whereas the variation (σ) in fill density in Example No. 1 was as low as 0.18. Thus, it can be seen that the flowability was improved by granulating. The compactability was naturally improved as well by granulating. The percentage of cracking or chipping observed in the compacts of Example No. 1 was much lower than in Comparative Example No. 9. These effects achieved by granulation were confirmed in the other examples, too.

Each of the resultant compacts was sintered at 1,060° C. for approximately four hours within an Ar atmosphere, and then subjected to an aging treatment at 600° C. for one hour, thereby obtaining a sintered body. Thereafter, this sintered body was further magnetized at 2,387 kA/m to obtain a sintered magnet. 50 samples were obtained for each of the examples of the present invention and comparative examples.

Figure 5:
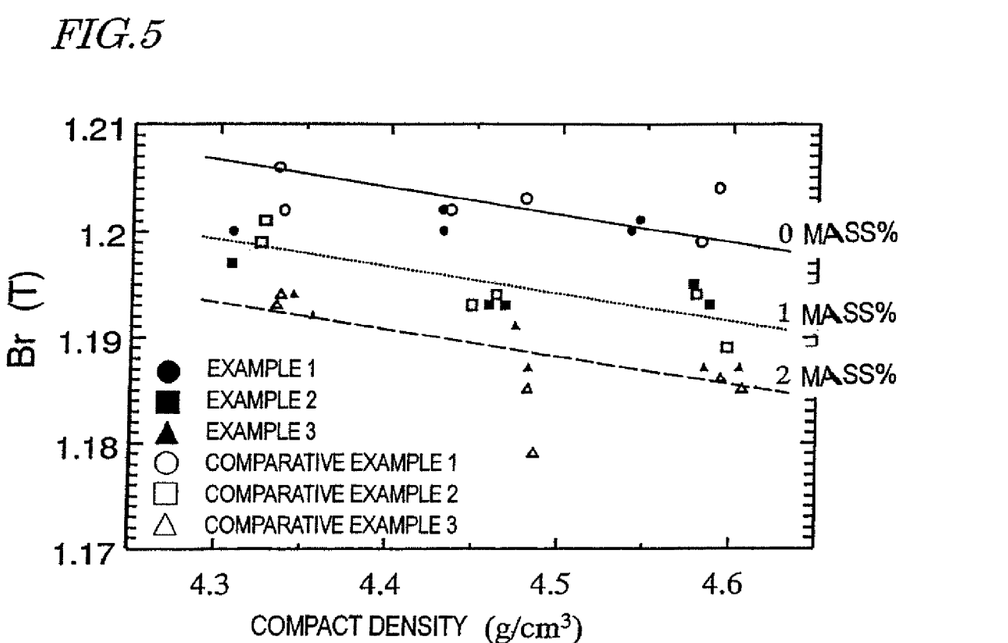
FIG. 5 is a graph showing the remanences $B_r$ of sintered magnets that were made from granulated powders according to specific examples of the present invention and granulated powders according to comparative examples.

FIG. 5 shows the remanences $B_r$ (T) of the resultant sintered magnets. As can be seen from FIG. 5, substantially no difference was sensible between Br of Example No. 1 (as indicated by the solid circles in FIG. 5) and Br of Comparative Example No. 1 (as indicated by the open circles in FIG. 5). Thus, the sintered magnet exhibited excellent magnetic properties. Br of Examples Nos. 2 and 3 to which a granulating agent was added was approximately equal to Br of Comparative Example No. 2 or 3 to which the same amount of granulating agent was added but which used a material powder with no remnant magnetization. Even in granulating a powder by utilizing remnant magnetization, the granulating agent is preferably added in as small an amount as possible.

As described above, by making a granulated powder by utilizing the magnetic agglomeration force produced by the remnant magnetization of primary particles, even if the amount of the granulating agent to be added is reduced compared with a situation where a granulated powder is made by utilizing the coupling force of the granulating agent alone, at least the same degree of flowability is achieved. Accordingly, a sintered magnet exhibiting better magnetic properties can be produced with at least similar productivity compared with the conventional one. Furthermore, if a granulated powder is produced by utilizing only the remnant magnetization of primary particles, deterioration in magnetic properties can be substantially eliminated.

Next, Examples Nos. 4 through 6, in which a granulated powder was produced by using the producing machine 100, will be described. The same material powder as that of Examples 1 through 3 was also used.

The vessel 30 had an inside diameter D2 of 300 mm and a content volume of about $7 \times 10^4$ cm$^3$. In FIGS. 4(a) and 4(b), the flow rates $a_1 = a_2 = a_1' = a_2'$ was approximately 1 m$^3$/min, the flow rate $a_0'$ was approximately 2.0 m$^3$/min and the flow rates $b_2 = b_3 = b_2' = b_3'$ was approximately 0.75 m$^3$/min. Approximately 5 kg of rare-earth alloy material powder was loaded and the temperature of the nitrogen gas was controlled to about 30° C.

In making granulated powders representing Examples Nos. 5 and 6, polybdenum and isoparaffin were used as granulating agents as described by the applicant of the present application in Japanese Patent Application No. 2001-96572 and as in Examples Nos. 2 and 3. In Examples Nos. 5 and 6, various conditions were also defined such that the granulated powder had a mean particle size of 0.5 mm. The resultant granulated powder had a remnant magnetization of about 0.2 mT. In Examples Nos. 4 through 6, the granulating process was carried out for approximately 15 minutes. The following Table 2 summarizes the conditions under which the powders to be pressed were prepared and their rest angles for Examples Nos. 4 through 6:

TABLE 2

| Powder to be pressed | Granulated? | Remanent Magnetization | Granulating Agent | Approx. Rest Angle |
|---|---|---|---|---|
| Example 4 | Yes | Yes | 0 mass % | 45 degrees |
| Example 5 | Yes | Yes | 1 mass % | 45 degrees |
| Example 6 | Yes | Yes | 2 mass % | 44 degrees |

As can be seen from Table 2, the powders to be pressed representing Examples Nos. 4 and 5 had even smaller rest angles than the powders to be pressed representing Examples Nos. 1 and 2. Thus, by using the producing machine 100, the flowability was further improved. However, benefits obtained by using the producing machine 100 are not so much decreased rest angles as increase in the stability (or reproducibility) of the granulating process. For example, comparing the variations in the rest angle of the resultant granulated powders, it was discovered that the rest angle varied from 45 degrees to 49 degrees in Example No. 1, whereas the rest angle varied much less, i.e., from 44 degrees to 45 degrees, in Example No. 4. When the known granulating machine shown in FIG. 2 or the granulating machine disclosed in Japanese Patent Publication No. 3019953 (see FIG. 3 of this publication) was used, the process step of blowing the powder on an upward gas flow in the vessel (i.e., a blowing process step) and the process step of compressing the powder layer with a downward gas flow (i.e., consolidating process step) were carried out as two different process steps. However, the present inventors discovered that a rare-earth alloy granulated powder could be produced more efficiently by using the producing machine 100 such that the first gas flow for getting the blowing process step done and the second gas flow for getting the consolidating process step done were present in the same vessel at the same time. Among other things, significant effects are achieved when no granulating agents are used as shown for Example No. 4.

Using the powders to be pressed representing Examples Nos. 4 through 6 shown in Table 2, compacts were made as in Example No. 1 and the variation in mass (%) and variation in fill density (σ) among those compacts were evaluated. The compacts of Example No. 4 had a mass variation of about 4%, which was even smaller than that of Example No. 1. The same tendency was observed as for the variation in fill density (σ), too. Specifically, the fill density variation (σ) of Example No. 4 could be improved to 0.16. The mass variations (%) and fill density variations (σ) of compacts representing Examples Nos. 5 and 6 were at least comparable to those of Examples Nos. 2 and 3.

Each of the compacts representing Examples Nos. 4 through 6 was sintered at 1,060° C. for approximately 4 hours within an Ar atmosphere and then subjected to an aging treatment at 600° C. for an hour, thereby obtaining a sintered body. Thereafter, this sintered body was further magnetized at 2,387 kA/m to obtain a sintered magnet. 50 samples were obtained for each of Examples Nos. 4 through 6. The sintered magnets representing Examples Nos. 4, 5 and 6 had remanences $B_r$ (T) that were approximately equal to those of Examples Nos. 1, 2 and 3, respectively. By using the producing machine 100, a granulated powder can be produced more constantly than the conventional process. Accordingly, the granulated powder can be obtained with a smaller amount of granulating agents than the conventional process (or even no granulating agents at all). As a result, a sintered magnet exhibiting better magnetic properties (e.g., remanence $B_r$ among other things) than conventional ones can be obtained.

INDUSTRIAL APPLICABILITY

The present invention provides a method of making a rare-earth alloy granulated powder, which has good flowability and good compactability and which makes it possible to produce a magnet with excellent magnetic properties. A method of making a quality rare-earth alloy sintered body with high productivity by using such a granulated powder is provided.

According to the present invention, the flowability and compactability of a rare-earth alloy powder can be improved without deteriorating the magnetic properties. Thus, even a sintered magnet, which should have too intricate a shape to be pressed and compacted easily and which should have sacrificed its magnetic properties to a certain degree in the prior art, can also have improved magnetic properties. In addition, the granulating time can be shortened and the binder removal process can be omitted. As a result, the productivity of rare-earth sintered magnets can be increased.

What is claimed is:

1. A method of making a rare-earth alloy granulated powder, the method comprising the steps of:
    preparing a rare-earth alloy powder;
    generating remanent magnetization in the powder; and
    granulating the powder by utilizing agglomeration force produced by the remanent magnetization of the powder, wherein the powder has a mean particle size of 1.5 µm to 6 µm, wherein the step of granulating includes a step of making a granulated powder with a mean particle size of 0.05 mm to 3.0 mm.

2. The method of claim 1, wherein the step of granulating includes the step of giving kinetic energy to particles of the powder, and wherein the particles grow under a tumbling action, produced by the kinetic energy given, under a substantially zero magnetic field.

3. The method of claim 1, comprising the steps of:
    preparing the powder with remanent magnetization in a vessel; and
    giving the powder particles kinetic energy under a substantially zero magnetic field in the vessel.

4. The method of claim 1, comprising the steps of:
    preparing the powder in a vessel;
    generating remanent magnetization in the powder in the vessel by applying a magnetic field to the powder; and
    giving kinetic energy to the powder particles with the remanent magnetization under a substantially zero magnetic field in the vessel.

5. The method of claim 1, further comprising the step of adding a granulating agent to the powder.

6. The method of claim 1, further comprising the step of not adding any granulating agent to the powder.

7. The method of claim 1, wherein the step of generating remanent magnetization in the powder includes the step of applying an alternating demagnetizing field.

8. The method of claim 1, wherein the rare-earth alloy is an R—Fe—B based alloy including 2 mass % or more of Dy, 1 mass % or more of Tb, or 1 mass % or more of Dy and Tb.

9. A method of making a rare-earth alloy sintered body, the method comprising the steps of:
    making a rare-earth alloy granulated powder by the method of claim 1;
    filling a cavity with a rare-earth alloy powder, including the granulated powder, without applying any demagnetizing magnetic field to the granulated powder;
    making a compact by pressing the rare-earth alloy powder, including the granulated powder, with an aligning magnetic field applied thereto; and
    sintering the compact.

* * * * *